United States Patent Office 3,333,941
Patented Aug. 1, 1967

3,333,941
ACID-WETTED EXPANDABLE PHOSPHOROUS CONTAINING GRAPHITE COMPOSITION AND METHOD OF PREPARATION
Franciszek Olstowski, Freeport, Tex., assignor to The Dow Chemical Company, Midland, Mich., a corporation of Delaware
No Drawing. Filed Sept. 22, 1966, Ser. No. 581,180
10 Claims. (Cl. 71—39)

ABSTRACT OF THE DISCLOSURE

A heat expandable composition comprising a mixture of natural crystalline graphite and $P_2O_5$ wetted with a strong acidizing acid. An expanded form of graphite containing oxidized phosphorous values is obtained by heating such expandable composition to a temperature of from about 180° C. to about 800° C. The heat expandable graphite composition is useful as a flame retarding agent and the expanded graphite material is useful as a mulch or as a pH control agent.

This application is a continuation-in-part of application Ser. No. 302,460, filed Aug. 15, 1963, now abandoned.

This invention relates to a novel, expandable graphite composition and to a method of its preparation and more particularly is concerned with a novel, expandable graphite composition having soluble, oxidized phosphorous values entrapped therein.

The novel composition of the present invention is suitable for use in the expanded form as an agricultural mulching agent having soluble phosphate values. The so-treated graphite in the expandable form also finds utility as a flame retarding agent. Additionally, the expanded product, even after relatively high temperature expansion treatment, retains considerable amounts of water soluble acidic phosphorous values thereby enabling it to be used as a solid agent for pH control in aqueous environments.

It is a principal object of the present invention to provide a novel acid-treated expandable graphite composition having phosphorous values in connection therewith.

It is another object of the present invention to provide a novel graphite composition that is readily expandable at moderately elevated temperatures into a low bulk density product which retains an effective amount of water soluble phosphorous values.

It is a further object of the present invention to provide a novel graphite composition having flame retardant properties.

It is also an object of the present invention to provide a method for producing an expanded graphite having a low bulk density wherein the expanded graphite product retains oxidized phosphorous values incorporated therewith.

These and other objects and advantages readily will become apparent from the detailed description presented hereinafter.

The composition of the present invention comprises a natural crystalline flake or crystalline lump graphite which has a phosphorous oxide admixed therewith and which has been wetted with a strong inorganic oxidizing acid.

More particularly the present composition comprises a natural crystalline flake or natural lump graphite wetted with a strong oxidizing acid and having in admixture therewith from about 2 to about 500 weight percent of a phosphorous oxide, preferably phosphorous pentoxide ($P_2O_5$), based on the weight of the graphite charged.

The term "strong oxidizing acid" as used herein refers to the following acids and mixtures thereof:

(1) concentrated nitric acid of at least about 60 weight percent $HNO_3$ concentration, or
(2) concentrated sulfuric acid of at least about 90 weight percent $H_2SO_4$ concentration, or
(3) mixtures of the concentrated nitric and sulfuric acids (1) and (2), or
(4) aqueous solutions of a member selected from the group consisting of perchloric ($HClO_4$) and periodic ($HIO_4 \cdot 7H_2O$) acid wherein the acid content is from about 6 to about 60 weight percent.

To prepare the composition of this invention, the natural crystalline flake or lump graphite is wetted with one or more of the above defined strong oxidizing acids.

The acid/graphite weight proportions to be employed range from about 0.25–4/1. Ordinarily, for ease of handling either concentrated sulfuric acid of about 98 weight percent $H_2SO_4$, concentrated nitric acid of about 70 weight percent $HNO_3$, or aqueous perchloric acid of about 15 to about 60 weight percent $HClO_4$ is used to wet the graphite-$P_2O_5$ mixture.

The so-wetted phosphorous containing graphite composition is readily expandable, as prepared, by heating to a temperature of at least about 180° C.

In preparing the present composition ordinarily the graphite is treated with the acid, usually at about room temperatures, i.e. about 18 to about 30° C. Higher or lower temperatures can be employed if desired. The contact time for acid treating the graphite can be as short as one minute. However, the acid treating time is not critical and there is no detrimental decrease in the overall expansion of the acid treated product upon subsequent heat treatment if the graphite is treated with the acid for extended periods of time, i.e. hours or days.

Ordinarily, in actual practice, the phosphorous oxide is blended into the mix after the oxidizing acid addition. For ease of mixing preferably this latter material is used in the finely divided state. Alternatively, if desired, the $P_2O_5$ first can be blended with the graphite and this mix then be wetted with the oxidizing acid.

The final acid treated $P_2O_5$-containing graphite composition is expanded by heating at a temperature of at least about 180° C. Ordinarily the expansion is carried out at a temperature of from about 200 to about 800° C. although higher temperatures can be employed, if desired. Preferably, the expansion is carried out at a temperature of from about 250 to about 650° C. In general, as the expansion temperature is increased over the range set forth herein the apparent bulk density of the expanded product decreases. For equivalent expansions at a predetermined expansion temperature to produce expanded products of low apparent bulk densities, e.g. 2 pounds/cubic foot and lower, the oxidizing acid can be selected accordingly. To illustrate, the following oxidizing acid-expansion temperature combinations all can give products of about the same expansion and approximately the same apparent bulk densities:

| | Expansion temperature, ° C. |
|---|---|
| Aqueous perchloric acid | 200 |
| Concentrated nitric acid | 250–300 |
| Concentrated nitric acid-sulfuric acid mixture | 300–400 |
| Concentrated sulfuric acid | >400 |

Graphite treated and expanded as described herein generally increases in volume from about 25 to about 200 times and produces an expanded product which is a particulate, vermicular or worm-like form. The term "apparent bulk density" as used herein refers to the density calculated from the volume occupied by a weighed amount of the expanded product introduced by free fall and vibration settling into a vessel of calibrated volume.

In the preparing the present graphite composition, ordinarily the acid treated material is separated from any excess acid and subjected, without washing, to the heat treatment expansion step. The composition can be stored indefinitely prior to expansion without undergoing any detrimental degradation of expansion efficiency. A peculiar advantage of the present composition and its method of preparation is that water-washing of the acid treated mass is not required. In fact, such washing actually tends to reduce the expandability of the composition upon subsequent heating as well as leaches the useful phosphorous values therefrom.

Substantially about 100 percent conversion of the original graphite flake into a low bulk density expanded vermicular product is realized by following the present process employing the composition of this invention.

Natural graphite materials suitable for use in the present process are crystalline lump materials recovered from vein deposits, for example, Ceylon graphite, and crystalline flake materials recovered from layered metamorphosed rock, for example, Madagascar graphite. Naturally occurring amorphous graphite, e.g. from metamorphose coal beds deposited in Mexico, and synthetic polycrystalline graphite have not been found to be suitable for use in the present process. Ordinarily, the graphite used for preparing the present composition ranges from about 10 to about 325 mesh, U.S. Standard Sieve, preferably 20-200 mesh, but these particulations are not critical. With exceedingly finely divided graphite, preferably peroxyhalo acids are used as the oxidizing acid source material.

Reactors, material handling equipment, material transporting means and the like equipment to be used in preparing and storing the composition are to be constructed of materials that are not detrimentally attacked by the reactants or products and which are operable under the reaction conditions as is understood by one skilled in the art.

The acid-treated graphite composition can be expanded in free form or can be incorporated into barious inorganic and organic materials prior to expansion to impart special characteristics, e.g. flame-retardant properties, to these media.

The following examples will serve to further illustrate the present invention but are not meant to limit it thereto.

*Example 1*

A commercially available natural crystalline Grade No. 1 flake graphite having a particle size of from about 20 to about 70 mesh, U.S. Standard Sieve and a bulk density of about 51 lbs./cubic foot was used as starting material.

About 20 grams of the flake graphite were wetted with about 20 grams of concentrated sulfuric acid (about 98 weight percent $H_2SO_4$) and to the acid-wetted flake was added about 6 grams of finely divided $P_2O_5$. The resulting mixture was stirred for a few minutes at room temperature, i.e. about 25° C. to blend the $P_2O_5$ substantially homogeneously throughout the mass.

A portion of the graphite composition was heated by contact with the flame from a propane torch to a temperature of about 800° C. Upon heating, the graphite expanded to form a vermicular product having an apparent bulk density of about 2.5 pounds/cubic foot.

In a second run, about 10 grams of the Grade No. 1 natural flake graphite was wetted with about 20 grams of concentrated nitric acid (containing about 70 weight percent $HNO_3$) and into this mixture at room temperature (about 25° C.) was stirred about 4 grams of $P_2O_5$. A portion of this mix was subjected to the flame of a propane torch and expanded into a vermicular graphite product having an apparent bulk density of about 2.6 pounds/cubic foot.

*Example 2*

About 50 grams of the Grade No. 1 natural graphite flake described in Example 1 were wetted with about 30 grams of concentrated nitric acid (about 70 weight percent $HNO_3$). About one gram of $P_2O_5$ was stirred into the nitric acid treated flake. The resulting mixture was heated at a temperature of about 200° C. thereupon producing an expanded product having an apparent bulk density of about 14 pounds per cubic foot.

*Example 3*

About 20 grams of the natural flake graphite described in Example 1 were wetted with about 10 grams of concentrated sulfuric acid (about 98 weight percent $H_2SO_4$) and about one gram of $P_2O_5$ stirred therein. The resulting mixture was placed in a nickel crucible which had been preheated to a temperature of about 600° C. The graphite flake expanded almost immediately to produce a vermicular product having a bulk density of about 9 pounds per cubic foot.

*Example 4*

To about 11 grams of natural crystalline graphite flake were added about 8 grams of concentrated sulfuric acid (about 98 weight percent $H_2SO_4$) and about 5 grams of $P_2O_5$. The components were blended and the resulting mixture placed in a nickel crucible preheated to a temperature of about 600° C. The flakes expanded almost immediately into a vermicular product having an apparent bulk density of about 4 pounds per cubic foot.

About 3 grams of the expanded graphite product were stirred into about 200 cubic centimeters of distilled water having an initial, measured pH of about 5.8. A pH measurement of the resulting mixture indicated a pH of about 2.

*Example 5*

Various weighed portions of a natural flake graphite were wetted with either $HNO_3$ or $H_2SO_4$ followed by blending a weighed portion of $P_2O_5$ into the wetted flake. The mixture was then heated to produce a vermicular product of low bulk density. The resulting expanded materials were analyzed by wet chemical methods for elemental phosphorous. Table I which follows summarizes the results of a number of runs.

TABLE I

| Run No. | Graphite Flake (grams) | Reactants | | $P_2O_5$ Wt. (grams) | Treatment, Expansion Temp., °C. | Results | |
|---|---|---|---|---|---|---|---|
| | | Acid | | | | Expanded Bulk Density, lbs./cu. ft. | Product Residual Phosphorous, Percent |
| | | Type | Weight (grams) | | | | |
| 1 | 20 | 70% $HNO_3$ | 10 | 2 | 480 | 1.74 | 3.28 |
| 2 | 10 | 98% $H_2SO_4$ | 10 | 10 | 400 | 12.5 | 14.56 |
| 3 | 3.3 | 70% $HNO_3$ | 2 | 10.8 | 200 | 2.43 | 27.34 |

*Example 6*

About 5 grams of $P_2O_5$ were added to about 20 grams of natural flake graphite and the mixture wetted with about 10 grams of 98% $H_2SO_4$. The resulting mixture was blended to provide a substantially homogeneous mass. This composition upon heating in a nickel crucible at about 600° C. almost immediately expanded into a graphite product having an apparent bulk density of about 4.1 pounds per cubic foot.

In a control study, a 20 gram sample of the same natural graphite was stirred together with about 6.8 grams of 100% H₃PO₄ and about 12 grams of 98% H₂SO₄ and the resulting mixture heated to about 100° C. for about one hour. Subsequently a portion of the mixture was heated for about 20 minutes in a nickel crucible maintained at a temperature of between about 600–640° C. No significant expansion of the composition was observed during the heating or after the relatively long heat treating period.

*Example 7*

A phosphorous-containing expandable graphite composition was prepared by mixing about 2.29 grams of natural flake graphite, about 1.04 grams P₂O₅ and about 1.67 grams of about 98% H₂SO₄.

A foamable polyurethane composition was prepared by mixing about 25.8 grams of prepolymer (toluene diisocyanate containing about 30.6 weight percent —NCO groups) with about 27.5 grams of a polyol mix (containing a polyether catalyst and CFCl₃ foaming agent). About 5 grams of the expandable, phosphorous-containing graphite composition was incorporated into the polyurethane reaction mixture.

The reactants were stirred together, poured into a 4-inch diameter paper carton whereupon the mass foamed and set. The resulting polyurethane foam, upon elemental analysis, was found to contain about 3.93 weight percent graphite and about 0.83 weight percent phosphorous.

For comparative purposes, a second polyurethane foam was prepared in the same manner which contained about 8.6 weight percent of an expandable flake graphite prepared from a graphite flake which had been wetted with a mixture of concentrated sulfuric acid and concentrated nitric acid but to which no phosphorous oxide had been added.

After the foam composition had hardened, a 4-inch diameter circular section about 2 inches thick was cut from the cast structure, the sections weighed and exposed for 120 seconds to flame contact with an alcohol lamp under substantially identical conditions. The residual foams were re-weighed to determine polymer loss from flame decomposition.

For comparative purposes, similarly sized sections of a commercially available fire retardant rigid polyurethane foam containing about 1.7 weight percent phosphorous and a rigid polyurethane foam having no flame retardant properties were also subjected in the same manner to the alcohol lamp flame test.

The results of these tests are presented in Table II.

ticulate, expanded graphite having an apparent bulk density of about 1.5 pounds/cubic foot.

About 2 grams of the expanded product were placed in 100 grams of distilled water. Measurement of the resulting liquid indicated a pH of about 2. The water itself had a pH of about 5.6.

For control purposes, a second 5 gram sample of the original graphite flake was treated with about 4 grams of the 60% HClO₄ acid solution and subsequently expanded as in the run described directly hereinbefore. This expanded product also had an apparent bulk density of about 1.5 pounds/cubic foot.

Two grams of this product were placed in about 100 grams of distilled water. The measured pH was substantially the same as for the water itself, i.e. about 5.6.

In a manner similar to that described for the foregoing examples, a particulated Ceylon lump graphite in combination with P₂O₅ can be wetted with a mixture of concentrated sulfuric and nitric acids. Similarly a crystalline flake graphite can be treated with fuming nitric acid and this mixture then be blended with finely divided phosphorous oxide. Also a composition of P₂O₅ natural crystalline flake graphite and fuming sulfuric acid can be prepared and heated to produce an expanded vermicular phosphorous oxide containing graphite. Aqueous periodic acid containing 50 weight percent periodic acid mixed with a mixture of P₂O₅ and crystalline lump graphite, likewise provides a phosphorous-containing expandable graphite composition. Similarly, a mixture of concentrated sulfuric acid and nitric acid can be used to wet a blend of graphite and P₂O₅. All of these combinations provide heat-expandable graphite compositions which on expansion provide a low density expanded graphite having water soluble phosphorous values contained therewith. It is to be understood that oxidizing acid-graphite-phosphorous oxide concentrations and proportions to be used are those set forth hereinbefore.

Various modifications can be made in the present invention without departing from the spirit or scope thereof for it is understood that I limit myself only as defined in the appended claims.

I claim:
1. An expandable graphite composition which comprises:
   (a) a natural crystalline graphite,
   (b) from about 2 to about 500 weight percent of P₂O₅ in admixture with said graphite, the weight of said P₂O₅ being based on the weight of said graphite, and said mixture wetted with

TABLE II

| Run No. | Type, Polyurethane Foam | Added Ingredients | | Original Wt. of Sample (grams) | Wt. Loss on Flame Test (grams) |
|---|---|---|---|---|---|
| | | Phosphorous Compound, Wt. Percent [1] | Graphite, Wt. Percent [2] | | |
| 1 | Containing expandable flake graphite treated with P₂O₅. | 0.83 | 3.93 | 18 | 5.5 |
| 2 | Containing H₂SO₄–HNO₃ treated expandable flake graphite. | | 15.8 | 18 | 8 |
| 3 | Commercial flame retardant | 1.7 | | 17.5 | 8 |
| 4 | No additive (control) | | | [3] | [3] |

[1] Expressed as elemental phosphorous.
[2] Expressed as elemental graphite.
[3] Burns to completion upon ignition.

*Example 8*

About 5 grams of a No. 1 natural flake crystalline graphite was mixed with about 4 grams of an aqueous perchloric acid solution containing about 60 weight percent HClO₄. About 2 grams of powdered P₂O₅ was stirred into the acid treated flake to provide a substantially homogeneous composition.

A sample of the resulting product was placed in a nickel crucible and heated at about 210° C. to provide a par- (c) at least one oxidizing acid selected from the group, consisting of,
   (1) concentrated nitric acid of at least about 60 weight percent HNO₃ concentration,
   (2) concentrated sulfuric acid of at least about 90 weight percent H₂SO₄ concentration,
   (3) mixtures of said concentrated nitric acid (1) and sulfuric acid (2), and
   (4) aqueous solutions of a member selected from the group consisting of perchloric (HClO₄) and periodic ($HIO_4 \cdot 2H_2O$) acid wherein the acid content is from about 6 to about 60 weight percent, the weight proportion of said graphite to said oxidizing acid ranging from about 0.25–4/1.

2. An expandable graphite composition which comprises:
 (a) a natural crystalline graphite,
 (b) nitric acid of at least about 60 weight percent $HNO_3$, said graphite being wetted with said nitric acid at a weight proportion of graphite to said acid ranging from about 0.25–4/1, and
 (c) from about 2 to about 500 weight percent, based on the weight of said graphite, of $P_2O_5$ in intimate admixture with said wetted graphite.

3. The composition of claim 2 wherein the acid is sulfuric acid of at least about 90 weight percent $H_2SO_4$.

4. The composition of claim 2 wherein the acid is aqueous perchloric acid ranging in concentration from about 15 to about 60 weight percent $HClO_4$.

5. The composition of claim 2 wherein the nitric acid has a concentration of about 70 weight percent $HNO_3$.

6. The composition of claim 2 wherein the acid is sulfuric acid having a concentration of about 98 weight percent $H_2SO_4$.

7. The composition of claim 2 wherein the acid is perchloric acid having a concentration of about 60 weight percent $HClO_4$.

8. A process for preparing an expanded graphite having water soluble, oxidized phosphorous values in admixture therewith which comprises:
 (a) wetting a natural crystalline graphite with at least one oxidizing acid selected from the group consisting of,
  (1) concentrated nitric acid of at least about 60 weight percent $HNO_3$ concentration,
  (2) concentrated sulfuric acid of at least about 90 weight percent $H_2SO_4$ concentration,
  (3) mixtures of said nitric acid (1) and said sulfuric acid (2), and
  (4) aqueous solutions of a member selected from the group consisting of perchloric ($HClO_4$) and periodic ($HIO_4 \cdot 2H_2O$) acid wherein the acid content is from about 6 to about 60 weight percent, the weight proportion of said graphite to said oxidizing acid ranging from about 0.25–4/1.,
 (b) admixing with the acid-wetted graphite an amount of $P_2O_5$ ranging from about 2 to about 500 weight percent based on the weight of said graphite, and
 (c) heating the acid treated and $P_2O_5$ containing graphite composition to a temperature of from about 180 to about 800° C. thereby to provide an expanded graphite of low density having water soluble, oxidized phosphorous values in admixture therewith.

9. The process as defined in claim 8 wherein the acid wetting of the graphite and admixing the $P_2O_5$ with the graphite is carried out at about room temperature and the so-wetted phosphorous containing graphite composition is heated at a temperature of from about 250 to about 650° C. thereby to produce the low density expanded graphite product.

10. An expanded graphite of low bulk density having in intimate admixture therewith water soluble $P_2O_5$, values in a proportion of from about 2 to about 500 weight percent of the weight of said expanded graphite.

References Cited
UNITED STATES PATENTS

| | | | |
|---|---|---|---|
| 1,032,763 | 7/1912 | Newberry et al. | 71—23 |
| 1,137,373 | 4/1915 | Aylsworth | 252—378 |
| 1,191,383 | 7/1916 | Aylsworth | 252—378 |
| 1,668,464 | 4/1925 | Pease | 71—37 |
| 2,904,424 | 9/1959 | Chapman et al. | 71—51 |
| 3,247,134 | 4/1966 | Hwa et al. | 260—2.5 |

DONALL H. SYLVESTER, *Primary Examiner.*

G. R. MYERS, *Assistant Examiner.*